Figure 1:
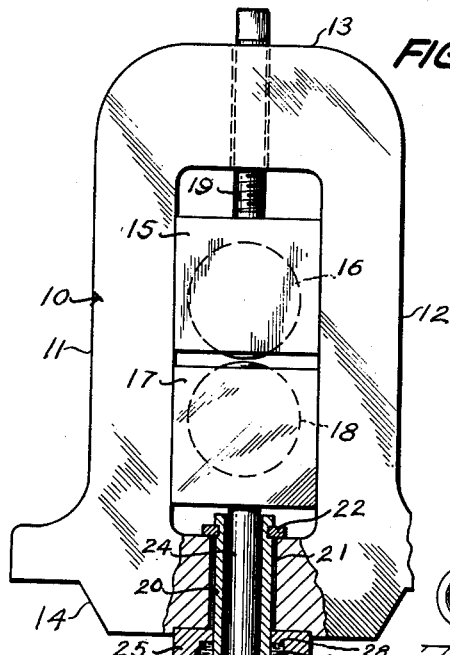

Nov. 19, 1963     H. S. METZGER     3,111,047
HYDRAULIC ADJUSTING MEANS FOR ROLLING MILLS
Filed March 13, 1961

INVENTOR
Hans Siegfrid METZGER

BY *[signature]*

ATTYS

United States Patent Office 3,111,047
Patented Nov. 19, 1963

3,111,047
HYDRAULIC ADJUSTING MEANS FOR
ROLLING MILLS
Hans Siegfried Metzger, St. Ingbert, Saar, Germany
Filed Mar. 13, 1961, Ser. No. 95,362
Claims priority, application Germany Mar. 14, 1960
7 Claims. (Cl. 80—56)

This invention relates to metal working and more particularly to a rolling mill, including a hydraulic means for continuously and rapidly adjusting the roll gap in order to maintain the accuracy of rolled work pieces.

Heretofore rolling mills have been provided with mechanical means, such as adjusting screws and the like, for adjusting the roll gap and such adjusting means have been operated, either manually or by power means, in order to control the cross sectional size of rolled work pieces. Such mechanical adjusting means has been quite satisfactory for preliminary adjustment of the roll gap and has also been comparatively satisfactory for making adjustments where changes in the roll gap need not be relatively rapid. These mechanical adjusting devices do not conveniently permit relatively rapid adjustment, since such mechanical adjusting devices inherently include relatively large friction and inertia conditions which must be overcome in adjusting the roll gap. These conditions present no particular problem where the adjustment can be made at leisure during stoppage of the rolling mill, but the provision of continuous and relatively rapid adjustment during operation of the rolling mill has, with present mechanical adjusting devices, presented a problem which has not heretofore been satisfactorily solved.

It has been heretofore proposed to substitute hydraulic adjusting devices for the mechanical adjusting devices previously utilized and theoretically at least, such hydraulic adjusting devices should be superior to the mechanical adjusting devices, since frictional forces, such as those developed in the threads of adjusting screws are eliminated by the use of such hydraulic means. While hydraulic adjusting devices have been utilized to a limited extent for a long period of time, nevertheless, such devices have not found widespread application, possibly because of the fact that the rolling pressure was transmitted through such devices thereby requiring that relatively high fluid pressures be utilized and under these conditions, the compressibility of the hydraulic fluid utilized materially affects the accuracy of the adjustment and compensating for such compressibility has proved particularly difficult since this is not a constant condition, but continuously changes in relation to changes of the hydraulic pressure. Accordingly, hydraulic adjusting means even combined with electronic control systems as heretofore applied have not satisfactorily solved the problem of continuously and accurately maintaining tolerances in rolled work pieces.

The present invention, on the other hand, contemplates the provision of a solid rolling mill frame incorporating slidable chocks for supporting the rolls and in which mechanical means may be provided for initially adjusting the roll gap and in which additional hydraulic means is provided for adjusting the position of one of the chocks, such adjustment being accomplished by the application of hydraulic pressure to stretch a sleeve within the elastic limit thereof, such stretching movement being transmitted to the chock to be adjusted and such hydraulic means may, of course, be actuated by a suitable electronic control, although the electronic control forms no part of the instant invention and is not disclosed in this application.

The mechanical control utilized for initial adjustment of the roll gap may constitute a separate mechanism or may if desired, be combined with the hydraulic adjusting means and furthermore, hydraulic means may also be provided to facilitate operation of the mechanical adjusting means. In this way, the advantages of hydraulic adjusting means may be applied to and utilized in connection with a solid frame rolling mill.

It is accordingly an object of the invention to provide a rolling mill having a solid frame and incorporating mechanical adjusting means for the roll gap, as well as hydraulic adjusting means for such roll gap.

A further object of the invention is the provision of a rolling mill utilizing a solid frame and in which hydraulic means is provided for continuously and rapidly adjusting the roll gap during rolling operations.

A still further object of the invention is the provision of a rolling mill utilizing a solid frame and in which hydraulic adjusting means is provided for continuously and rapidly adjusting the roll gap during rolling operation, which hydraulic adjusting means eliminates the necessity for overcoming relatively large frictional and inertia forces heretofore encountered in making such adjustments.

Another object of the invention is the provision of a rolling mill utilizing a solid frame in which mechanical means is provided for initially adjusting the roll gap and in which separate hydraulic means is provided for continuously and rapidly adjusting the roll gap during the rolling operation.

A further object of the invention is the provision of a rolling mill utilizing a solid frame in which combined mechanical and hydraulic adjusting means for the roll gap is provided, such means being operable mechanically to initially adjust the roll gap and operable hydraulically to continuously and rapidly adjust the roll gap during rolling operations.

A still further object of the invention is the provision of a rolling mill utilizing a solid frame and incorporating screw threaded mechanical means for initially adjusting the roll gap and hydraulic means for continuously and rapidly adjusting the roll gap during rolling operations and which means is also provided for hydraulically pre-stressing the threads of the mechanical adjusting means in order to prevent distortion of such threads during the rolling operation.

Another object of the invention is the provision of a rolling mill utilizing a solid frame and in which mechanical means is provided for initially adjusting the roll gap and in which hydraulic means is also provided for continuously and rapidly adjusting the roll gap during the rolling operation, there being further hydraulic means provided for relieving the pressure between the threads of the mechanical adjusting means in order to facilitate operation thereof, regardless of pressures exerted by the rolling operation.

A further object of the invention is the provision of a rolling mill utilizing a solid frame and incorporating hydraulic means for continuously and rapidly adjusting the roll gap during rolling operations, such hydraulic means incorporating a sleeve which may be pre-stretched hydraulically within the elastic limit, the movement of such sleeve during such stretching being transmitted to a chock of the rolling mill in order to adjust the roll gap.

Figure 2:
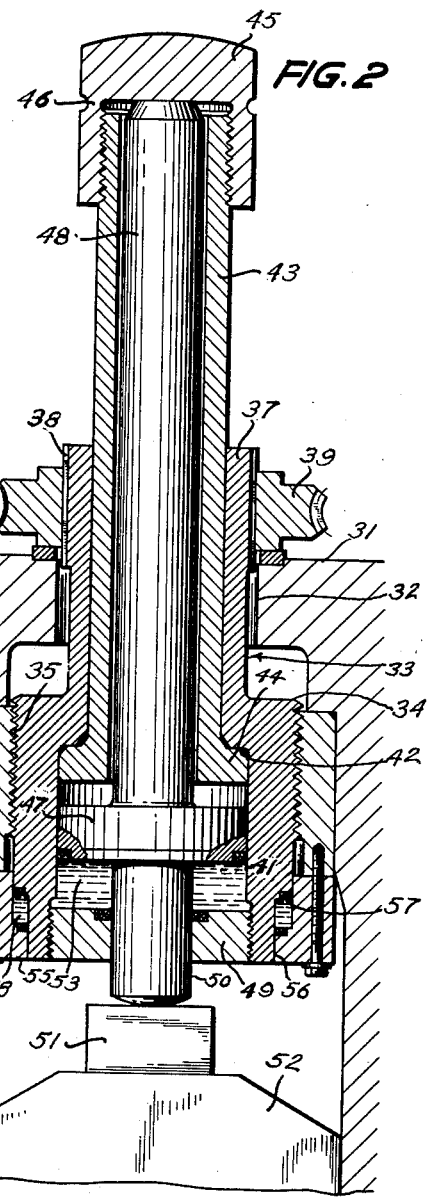
Figure 3:
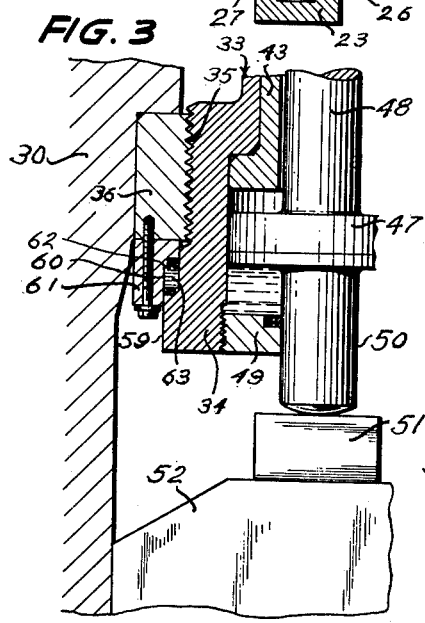

Further objects and advantages of the invention will be apparent from the following description taken in conjunction with the accompanying drawings wherein:

FIG. 1 is a diagrammatic view in elevation showing a rolling mill having mechanical means for adjusting the upper roll and hydraulic means constructed in accordance with this invention for adjusting the lower roll;

FIG. 2 is a fragmentary sectional view showing a modified form of the invention in which a combined mechanical and hydraulic adjusting means is provided for adjusting one of the rolls of the rolling mill; and FIG. 3 a fragmentary sectional view showing a further modified form of the invention in which hydraulic means is provided for relieving the load on the threads of a mechanical adjusting device in order to facilitate operation thereof.

With continued reference to the drawings there is shown in FIG. 1 a rolling mill frame 10 of the solid or closed type and including side upright members 11 and 12, an upper cross member 13 and a lower cross member 14. Slidably mounted between the upright members 11 and 12 for vertical movement is an upper chock 15 and rotatably mounted on the chock 15 is an upper roll 16. In a similar manner, a lower chock 17 is slidably mounted between the upright members 11 and 12 and rotatably mounted on the lower chock 17 is a lower roll 18. An adjusting screw 19 is threadedly received in the upper cross member 13 of the frame 10 and the adjusting screw 19 engages or is connected to the upper chock 15 in a manner to permit mechanical adjustment thereof by operation of the adjusting screw 19 to initially adjust the roll gap prior to the start of rolling operations.

A hydraulic adjusting means for the lower chock 17 and lower roll 18 constructed in accordance with this invention is clearly shown in FIG. 1 and may well comprise a sleeve 20 extending through an aperture 21 in the lower cross member 14 of the frame 10 and the sleeve 20 may be secured at the top as by a snap ring 22 or other suitable means against downward movement with respect to the frame 10. It is to be noted, that while the upper end of the sleeve 20 is fixed against downward movement with respect to the frame 10, that the remainder of the sleeve 20 may move downwardly within the aperture 21 with respect to the frame 10 and it is further to be noted, that the lower end of the sleeve 20 is closed by an enlarged annular portion 23. A push rod 24 is disposed in the sleeve 20 and the lower end of the push rod 24 engages the lower closed end of the sleeve 20, while the upper end of the push rod 24 engages the lower chock 17.

A block 25 is fixed to the lower surface of the cross member 14 of the frame 10 and the block 25 is provided with a downwardly opening recess 26 providing a cylinder which slidably receives the enlarged portion 23 of the lower end of the sleeve 20, this enlarged portion, in effect, constituting a piston disposed in the cylinder 26. The enlarged portion 23 comprising the piston presents an upwardly facing annular surface 27 and between this surface and the downwardly facing surface 28 of the recess 26 there is provided a fluid pressure chamber 29 to which fluid pressure may be supplied from any suitable source, and, of course, such fluid pressure may be controlled in any desired manner as by an electronic control means or by any other suitable control means.

In operation of this form of the invention, it is assumed that the upper roll 16 will be initially adjusted by operation of the mechanical adjusting screw 19 to initially adjust the roll gap and that during the rolling operation, the roll gap will be adjusted by applying fluid pressure to the chamber 29 which will result in stretching of the sleeve 20 downwardly within the elastic limit, such downward movement of the sleeve 20 being transferred to the lower chock 17 and lower roll 18 by the push rod 24 and, of course, upon release of the fluid pressure in the chamber 28, the sleeve 20 will retract upwardly transmitting such movement through the push rod 24 to the lower chock 17 and lower roll 18. Variation of the fluid pressure in the chamber 29 will result in a continuous and rapid adjustment of the lower chock 17 and lower roll 18 in a manner to provide an accurate rolling operation in order to maintain the desired rolling tolerances.

It will be seen that by this form of the invention there has been provided a hydraulic adjusting means for a rolling mill which may be utilized in connection with a mill incorporating a solid frame and in which the adjustment of the roll gap during rolling operations is accomplished by the expansion and contraction of a sleeve within the elastic limit of the material which, of course, substantially eliminates friction and inertia, thereby permitting rapid and accurate adjustments.

In FIG. 2 there is shown a somewhat modified form of the invention in which a mechanical adjusting means is combined with a hydraulic adjusting means and as shown in this figure, this form of the invention may well comprise a rolling mill frame 30 of the same general type as that described above in connection with FIG. 1, the frame 30 being provided with an upper cross member 31. The upper cross member 31 is provided with an aperture 32 through which projects a sleeve 33 which is provided with an enlarged lower end 34 having threads 35 on the exterior surface thereof. The enlarged lower end 34 of the sleeve 33 is threadedly received in a nut 36 fixed in the upper cross member 31 of the frame 30 and the upper end 37 of the sleeve 33 projects above the cross member 31 of the frame 30 and is provided with a spline 38 for slidably and non-rotatably receiving a worm wheel 39. Engaging the worm wheel 39 is a worm gear 40 which may be operated to drive the worm wheel 39 and sleeve 33 to cause vertical movement of the sleeve 33 by reason of the threaded engagement between the lower end 34 thereof and the nut 36.

The enlarged lower end 34 of the sleeve 33 is provided with a recess 41 terminating at the upper end in an inwardly extending annular shoulder 42 and extending upwardly through the sleeve 33 is an elongated tubular member 43 provided at the lower end with an annular flange 44 engaging the shoulder 42 to prevent upward movement of the tubular member 43 with respect to the sleeve 33. The upper end of the tubular member 43 is closed by a cap 45 and such cap may be provided with a weakened portion 46 which serves to provide a frangible portion in the cap 45, the purpose of which will be later described.

The recess 41 in the lower end 34 of the sleeve 33 serves to provide a cylinder in which is slidably received a piston 47 and extending upwardly from the piston 47 within the tubular member 43 is a push rod 48, the upper end of which engages the cap 45. The lower end of the cylinder 41 is closed by a cylinder head 49 and projecting downwardly from the piston 47 through the cylinder head 49 is a push rod 50. The lower end of the push rod 50 engages a pressure measuring device 51 which is entirely conventional in every respect and this pressure measuring device 51 in turn engages a chock 52 slidably mounted in the mill frame 30 and serving to support one of the mill rolls. The cylinder head 49 serves to provide a fluid pressure chamber 53 between such cylinder head and the lower surface of the piston 47.

The nut 36 may be provided with a downwardly extending portion 54 terminating in an inwardly extending annular flange 55 which slidably and rotatably engages the outer surface of the lower end 34 of the sleeve 33 and such lower end of the sleeve 33 is provided with a reduced portion 56 terminating in an outwardly extending annular shoulder 57 which together with the annular flange 55 on the extension 54 of the nut 36 provides a fluid pressure chamber 58, the purpose and operation of which will be presently described.

In the operation of the form of the invention shown in FIG. 2, the worm gear 40 may be operated to drive the worm wheel 39 and sleeve 33, thereby resulting in vertical movement of the sleeve 33 due to the threaded engagement between the lower end 34 thereof and the nut 36 and such movement will be transmitted through the push rod 50 to the chock 52 of the rolling mill and thereby mechanically adjust the roll gap. This mechanical adjustment is normally accomplished prior to start of the rolling operation. Thereafter, adjustment of the chock 52 may be carried out hydraulically by applying fluid pressure to the chamber 53 which results in moving the piston 47 and push rod 48 upwardly which in turn results in stretching the tubular member 43 within the elastic limit thereof, thereby permitting movement of the chock 52 upwardly in accordance with the expansion of the tubular member 43. Movement of the chock 52 in the opposite direction may be accomplished by relieving the fluid pressure in the chamber 53 which will result in retraction of the tubular member 43, such movement being transmitted through the push rod 48 and push rod 50 to the chock 52. The frangible portion 46 of the cap 45 may be calibrated to fracture under a predetermined load thereby protecting the associated equipment and preventing damage thereto due to excessive loads thereon.

Since the threads between the lower portion 34 of the sleeve 33 and the nut 36 are subject to distortion by reason of the load imposed thereon by the rolling pressure, it is sometimes desirable to pre-stress such threads and thereby prevent distortion thereof during the rolling operation and for this purpose, fluid pressure may be applied to the chamber 58 which results in moving the lower portion 34 of the sleeve 33 upwardly with respect to the nut 36 thereby pre-stressing the threads in the direction of force applied by the rolling pressure and preventing distortion of such threads during the rolling operation. The load on the threads may be relieved to permit mechanical adjustment of the chock 52 by relieving the fluid pressure in the chamber 58.

It will be seen that by this form of the invention there has been provided a relatively simple, yet highly effective combined mechanical and hydraulic control for the roll gap of a rolling mill and one which will result in providing extreme accuracy of rolling operation and also incorporating means to protect the apparatus against overload.

It is sometimes desirable to provide a mechanical adjustment of the roll gap during the rolling operation and since such mechanical adjustment cannot be conveniently accomplished in the normal rolling mill structure due to the pressure exerted on the threads of the mechanical adjusting means there is shown in FIG. 3 a structure whereby pressure on the threads of the mechanical adjusting means may be relieved during the rolling operation to permit convenient actuation of the mechanical adjusting means to effect the desired adjustment.

The structure shown in FIG. 3 is similar to that shown in FIG. 2, except that the lower end 34 of the sleeve 33 is provided with an outwardly extending annular flange 59 which is slidably and rotatably received in a recess 60 in a downwardly projecting extension 61 of the nut 36. The recess 60 in the extension 61 provides a downwardly facing shoulder 62 which, together with the annular flange 59, provides a fluid pressure chamber 63.

In operation, it will be seen that if fluid pressure is applied to the chamber 63, that the sleeve 33 will be urged downwardly with respect to the nut 36 thereby relieving pressure on the inter-engaging threads of the nut 36 and sleeve 33, since the rolling load is applied upwardly on the sleeve 33 and consequently, upon relieving of such load the sleeve 33 may be mechanically rotated to provide the desired adjustment. Furthermore, if desired, the fluid pressure chamber 63 may be utilized to transmit the entire rolling load between the frame and the sleeve 33, thereby relieving the threads of all load and aliminating distortion thereof.

It will be seen that by the above described invention there has been provided a highly effective hydraulic means for rapidly and continuously adjusting the roll gap of rolling mills which may be utilized in connection with rolling mills having a solid frame and in which the expansion and contraction of a sleeve or tubular member within the elastic limit is utilized to provide the adjusting movement. Furthermore, the adjusting device of this invention may be utilized in connection with electronic or other suitable control systems in order to provide proper control of the rolling gap during rolling operations and the structure of this invention provides means for preventing inaccuracies due to distortion of threads by pre-stressing such threads, or in another form of the invention, by eliminating the load on such threads.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A rolling mill comprising a frame, an upper chock slidably mounted in said frame, an upper roll rotatably mounted in said upper chock, mechanical means for moving said upper chock vertically to adjust the position of said upper roll, a lower chock slidably mounted in said frame, a lower roll rotatably mounted in said lower chock, hydraulic adjusting means for said lower chock comprising a sleeve disposed below said lower chock and closed at the lower end, the upper end of said sleeve being fixed to said frame with the remainder of said sleeve being free to move vertically with respect to said frame, a push rod disposed in said sleeve engaging the closed lower end thereof and the lower side of said lower chock, the lower end of said sleeve being enlarged to provide a piston having an annular upwardly facing pressure surface and a block fixed to said frame and having a downwardly opening recess providing a cylinder slidably receiving said piston with a fluid pressure chamber between said annular pressure surface and the downwardly facing surface of said cylinder, whereby upon application of fluid pressure to said cylinder said piston will move downwardly to stretch said sleeve and permit downward movement of said lower chock and roll and upon release of said fluid pressure said sleeve will retract and move said lower chock and roll upwardly.

2. A rolling mill including a frame, an upper chock slidably mounted in said frame and an upper roll rotatably mounted in said upper chock, a combined mechanical and hydraulic adjusting means for said upper chock and roll comprising a nut fixed to said frame above said chock, a sleeve threadedly engaging said nut for vertical movement, the upper end of said sleeve being splined and projecting above said frame, a gear slidably and non-rotatably mounted on the splined end of said sleeve, said sleeve having an enlarged recess providing a cylinder having a downwardly facing shoulder at the upper end, an upwardly extending tubular member received in said sleeve and having a flange engaging said shoulder, a cap closing the upper end of said tubular member, a piston slidably received in said cylinder and having a portion extending upwardly through said tubular member and engaging said cap and a portion extending downwardly and engaging said chock and a cylinder head closing the lower end of said cylinder and providing a fluid pressure chamber between the lower surface of said piston and said cylinder head, whereby upon operation of said gear to rotate said sleeve said chock will be mechanically adjusted and upon application of fluid pressure to said cylinder said tubular member will stretch upwardly to permit upward movement of said chock and upon release of said fluid pressure said tubular member will retract to move said chock downwardly.

3. A rolling mill including a frame, an upper chock slidably mounted in said frame and an upper roll rotatably mounted in said upper chock, a combined mechanical and hydraulic adjusting means for said upper chock and roll comprising a nut fixed to said frame above said chock, a sleeve threadedly engaging said nut for vertical movement, said sleeve having an enlarged recess providing a cylinder having a downwardly facing shoulder at the upper end, an upwardly extending tubular member received in said sleeve and having a flange engaging said shoulder to prevent upward movement of the tubular member with respect to said sleeve, a cap closing the upper end of said tubular member, a piston slidably received in said cylinder and having a portion extending upwardly through said tubular member and engaging said cap and a portion extending downwardly and engaging said chock and a cylinder head closing the lower end of said cylinder and providing a fluid pressure chamber between the lower surface of said piston and said cylinder head, whereby upon rotation of said sleeve said chock will be mechanically adjusted and upon application of fluid pressure to said cylinder said tubular member will stretch upwardly to permit upward movement of said chock and upon release of said fluid pressure said tubular member will retract to move said chock downwardly.

4. A rolling mill including a frame, an upper chock slidably mounted in said frame and an upper roll rotatably mounted in said upper chock, a combined mechanical and hydraulic adjusting means for said upper chock and roll comprising a nut fixed to said frame above said chock, a sleeve threadedly engaging said nut for vertical movement, said sleeve having an enlarged recess providing a cylinder, an upwardly extending tubular member in axial alignment with said sleeve, interengaging means on said sleeve and tubular member to prevent upward movement of said tubular member with respect to said sleeve, a cap closing the upper end of said tubular member, a piston slidably received in said cylinder and having a portion extending upwardly through said tubular member and engaging said cap and a portion extending downwardly and engaging said chock and a cylinder head closing the lower end of said cylinder and providing a fluid pressure chamber between the lower surface of said piston and said cylinder head, whereby upon rotation of said sleeve said chock will be mechanically adjusted and upon application of fluid pressure to said cylinder said tubular member will stretch upwardly to permit upward movement of said chock and upon release of said fluid pressure said tubular member will retract to move said chock downwardly.

5. A rolling mill as defined in claim 2, in which a downwardly opening annular recess is provided in the lower end of said nut, a downwardly facing shoulder at the upper end of said recess, a flange on said sleeve slidably and rotatably received in said last named recess and providing an upwardly facing shoulder, said last named shoulders providing a fluid pressure chamber, whereby upon application of fluid pressure to said last named chamber, said sleeve will be moved downwardly with respect to said nut to relieve the load on the thread of said nut and sleeve to facilitate rotation of said sleeve with respect to said nut for mechanical adjustment.

6. A rolling mill as defined in claim 4, in which a downwardly opening annular recess is provided in the lower end of said nut, a downwardly facing shoulder at the upper end of said recess, a flange on said sleeve slidably and rotatably received in said last named recess and providing an upwardly faced shoulder, said last named shoulders providing a fluid pressure chamber, whereby upon application of fluid pressure to said last named chamber said sleeve will be moved downwardly with respect to said nut to relieve the load on the threads of said nut and sleeve to facilitate rotation of said sleeve with respect to said nut for mechanical adjustment.

7. A rolling mill including a frame, a chock slidably mounted in said frame and a roll rotatably mounted in said chock, hydraulic adjusting means for said chock comprising a sleeve fixed at one end to said frame and closed at the opposite end, a rod in said sleeve engaging the closed end thereof and said chock and fluid pressure means for stretching said sleeve to adjust the position of said chock, the reaction force of said fluid pressure means being applied to said frame while the rolling pressure is applied to said rod and sleeve independently of said fluid pressure means.

References Cited in the file of this patent

UNITED STATES PATENTS

| 581,078 | Menne | Apr. 20, 1897 |
| 844,349 | Hale | Feb. 19, 1907 |
| 1,669,550 | Biggert | May 15, 1928 |
| 1,980,570 | Biggert | Nov. 13, 1934 |
| 2,430,410 | Pauls | Nov. 4, 1947 |
| 2,612,798 | Bailey | Oct. 7, 1952 |
| 2,734,407 | Smith | Feb. 14, 1956 |
| 2,792,730 | Cozzo | May 21, 1957 |
| 2,934,969 | Neumann | May 3, 1960 |
| 3,024,679 | Fox | Mar. 13, 1962 |

FOREIGN PATENTS

| 728,012 | Great Britain | Apr. 13, 1955 |
| 893,343 | France | Jan. 24, 1944 |
| 644,957 | Germany | May 19, 1937 |